United States Patent Office 2,946,662
Patented July 26, 1960

2,946,662

PREPARATION OF ALKALI METAL HYDRIDES

Neal J. Mosely, Mars, Pa., assignor, by mesne assignments, to Callery Chemical Company, Pittsburgh, Pa., a corporation of Pennsylvania No Drawing. Filed June 3, 1955, Ser. No. 513,153

8 Claims. (Cl. 23—204)

This invention relates to the preparation of alkali metal hydrides such as sodium hydride and in particular to the preparation of such hydrides by the reaction of an alkali metal and hydrogen in the presence of an improved catalyst.

Alkali metal hydrides such as NaH are usually prepared by the direct reaction of alkali metals with hydrogen at elevated temperatures. Sodium hydride, however, is a solid at the usual reaction temperatures (above 300° C.) and forms a coating on the metallic sodium which makes the absorption of hydrogen incomplete unless special means are employed to prevent this difficulty. In United States Patents 2,372,670; 2,372,671; and 2,504,927 there are disclosed various dispersing or surface active agents which when added to the reaction mixture materially increase the reaction rate and prevent the alkali metal hydride formed from coating the alkali metal employed. These agents include (1) fatty acids with more than eight carbon atoms and salts thereof (2) various alkali metal hydrocarbides and hydrocarbons capable of reacting with alkali metals to form hydrocarbides (3) acetylenic hydrocarbons and reaction products of an alkali metal with these hydrocarbons. More specifically, the following compounds have been claimed to be effective dispersing agents in the manufacture of NaH from sodium and hydrogen: stearic acid, cymene, magnesium stearate, acetylene, sodium acetylide and various sodium hydrocarbides.

Although several materials have been patented as dispersing agents for liquid sodium and other alkali metals in the preparation of their hydrides, it is not true that all dispersing agents are effective for this purpose. For example, stearic acid is an effective dispersing agent for liquid sodium in the preparation of NaH but 12-hydroxy stearic acid is ineffective. Several other known dispersing agents for liquid sodium were tested and found to be ineffective in the preparation of sodium hydride as shown by the data hereinafter set forth.

It is an object of this invention to provide an improved process for the preparation of sodium hydride and other alkali metal hydrides by the reaction of an alkali metal with hydrogen.

Another object is to improve the yield of sodium hydride obtained by using a more effective catalyst to promote the reaction of sodium with hydrogen.

This new and improved process for preparing alkali metal hydrides will be more fully described hereinafter and the novelty thereof will be particularly pointed out and distinctly claimed.

This invention is based upon the discovery that phenol when added in an amount equal to 0.1% to 5.0% by weight of the sodium or other alkali metal reacted is a very effective catalyst in the preparation of NaH or other alkali metal hydrides from liquid alkali metals and hydrogen.

The procedure used to prepare an alkali metal hydride such as sodium hydride was as follows: all reactions were carried out in a closed bomb under a constant hydrogen pressure of 5 p.s.i.g. at a temperature of 345° C. An inert solid or heel such as sand or preformed NaH was introduced into the bomb along with a predetermined amount of sodium and 3% by weight of catalyst based on the sodium. A hydrogen atmosphere was then applied to the bomb and the temperature raised to the desired reaction temperature. When the temperature passed the melting point of sodium, the mixture was agitated with a low speed stirrer. The hydrogen was supplied from a high pressure cylinder through a constant pressure reducing valve and the reaction rate determined by measuring the decrease in hydrogen pressure at the cylinder.

The effect of various catalysts on the reaction of sodium and hydrogen to yield NaH was determined by measuring the reaction rate at constant pressure and temperature. Since the starting time of the reaction was uncertain and the plot of percentage completion versus time did not indicate a consistent reaction order, no rate constants could be calculated. Therefore, an empirical method of presenting the rate data was used based on the most reliable portion of the reaction which was between 40 to 60% completion. The percentage reaction per minute over this range was calculated for each catalyst and this value was used as a reaction rate number for comparison of each material tested. Thus, the reaction rate number may be defined as 20 divided by the time required for the reaction to go from 40 to 60% completion.

Using the procedure described above, the reaction rate of sodium and hydrogen on a sand heel at 345° C. were measured with various catalysts and the results shown in Table I were obtained. In each case the catalyst weight was 3% of the weight of sodium used.

Table I

| Catalyst: | Reaction rate no. |
|---|---|
| None | 0.54 |
| Isopropyl ether | 0.45 |
| Terpineol | 0.87 |
| Pyridine | 1.05 |
| Stearic acid | 1.33 |
| Phenol | 3.60 |

Other materials which were tried but showed no catalytic activity were butyl alcohol, silicone grease, 12-hydroxy-stearic acid, isoamyl alcohol and tallow nitrile. It is readily apparent from the above table that phenol is more effective than any other material tested as a catalyst in promoting the reaction rate between sodium and hydrogen in the preparation of NaH.

In another series of experiments, the original sand heel was progressively diluted with NaH in successive experiments. Phenol was used as the catalyst (3% by weight of the sodium charged) at a temperature of 345° C. and a hydrogen pressure of 5 p.s.i.g. The reaction rate number and yield of NaH was determined with the following results:

Table II

| Heel, Wt. g. | Sand Est., Percent | Na charged, Wt. g. | Percent Yield NaH | Reaction Rate No. |
|---|---|---|---|---|
| 20 | 100 | 20 | 75.0 | 1.0 |
| 40 | 50 | 40 | 98.5 | 3.6 |
| 80 | 25 | 60 | 93.0 | 1.8 |
| 20 | 14 | 20 | 100.0 | 6.6 |
| 40 | 7 | 40 | 94.5 | 3.3 |

The percent yield was based upon the total amount of hydrogen absorbed during the run. The reaction rate number was the percent of reaction per minute between 40 and 60% completion of the reaction. It is obvious from the above data that high yields of NaH can be obtained by using phenol as a catalyst. The yield of NaH is also significantly increased when preformed NaH is used as a heel for starting the reaction than when sand alone is used.

Other experiments showed that phenol is not only a superior catalyst for increasing the reaction rate between sodium and hydrogen but also makes it possible to carry out the reaction at much lower temperatures (200° C.) compared to the reaction temperature of 300° C. and higher used in prior art methods. The upper limit of temperature is determined by the dissociation of NaH which for all practical purposes is 450° C. When NaH which has been prepared using phenol as a catalyst is used as a heel for subsequent preparation it is not necessary to add additional phenol for a period of several runs. The residual phenol in the NaH heel has a sufficient catalytic activity even when the phenol in the NaH has been diluted to a concentration as low as .1%. In commercial practice, phenol is added in an amount equal to about 3% of the sodium in the first run. Part of the NaH prepared is used as a heel in the next run for each of several succeeding runs until the phenol is so dilute as to be ineffective as a catalyst. At that point additional phenol is added to the reaction.

Although the preparation of sodium hydride has been used to illustrate this improved process, it should be obvious to those skilled in the art that this process may be used to prepare other alkali metal hydrides and that within the scope of the appended claims this invention may be practiced otherwise than as specifically described.

What I claim is:

1. In a method of preparing alkali metal hydrides in which an alkali metal mixed with a finely divided inert solid is reacted with hydrogen at a temperature above the melting point of said alkali metal, the improvement comprising carrying out said reaction in the presence of phenol in a small amount effective to catalyze said reaction.

2. A method according to claim 1 in which the alkali metal is sodium.

3. A method according to claim 1 in which the inert solid is alkali metal hydride.

4. In a method of preparing alkali metal hydrides in which an alkali metal mixed with a finely divided inert solid is reacted with hydrogen at a temperature above the melting point of said alkali metal, the improvement comprising carrying out said reaction in the presence of phenol as a catalyst, said phenol being present in an amount equal to 0.1 percent to 5 percent by weight based on the weight of said alkali metal.

5. A method according to claim 1 in which the reaction temperature is 200–450° C.

6. In a method of preparing sodium hydride in which a mixture of sodium metal and a finely divided inert solid carrier is continuously agitated at a temperature of about 200° to 450° C. and hydrogen is passed therethrough for reaction with said sodium, the improvement comprising including in said agitated mixture phenol in a small amount effective to catalyze said reaction.

7. A method according to claim 6 in which the phenol is present in an amount equal to 0.1% to 5% by weight based on the weight of sodium metal charged.

8. A method according to claim 6 in which the solid carrier is sodium hydride.

References Cited in the file of this patent

UNITED STATES PATENTS

| | | |
|---|---|---|
| 1,395,729 | Plauson | Nov. 1, 1921 |
| 2,372,670 | Hansley | Apr. 3, 1945 |
| 2,642,344 | Livingston | June 16, 1953 |

OTHER REFERENCES

Hansley et al.: "Chemical and Engineering News," vol. 23, No. 15, pages 1332, 1333, 1380 (August 10, 1945).

Hurd: "Chemistry of the Hydrides," 1952, pages 30–31.